United States Patent [19]

Seeley et al.

[11] 4,200,663

[45] Apr. 29, 1980

[54] CHOLESTEROL-FREE EGG PRODUCT HAVING IMPROVED COOKING TOLERANCE

[75] Inventors: Robert D. Seeley, Crestwood; Richard B. Seeley, Kirkwood, both of Mo.

[73] Assignee: S. & R. Food Co., Inc., Kirkwood, Mo.

[21] Appl. No.: 835,865

[22] Filed: Sep. 23, 1977

[51] Int. Cl.$^2$ .............................................. A23L 1/32
[52] U.S. Cl. .................................... 426/614; 426/804
[58] Field of Search ................ 426/575, 641, 804, 614

[56] References Cited

U.S. PATENT DOCUMENTS

| | | | |
|---|---|---|---|
| 3,409,443 | 11/1968 | Polya | 426/575 X |
| 3,475,180 | 10/1969 | Jones | 426/614 |
| 3,499,768 | 3/1970 | Moirano | 426/575 |
| 3,510,315 | 5/1970 | Hawley | 426/614 X |
| 3,804,951 | 4/1974 | Rapp | 426/575 X |
| 3,843,811 | 10/1974 | Seeley | 426/614 X |
| 3,911,144 | 10/1975 | Strong | 426/614 X |
| 3,987,212 | 10/1976 | Seeley et al. | 426/804 |

FOREIGN PATENT DOCUMENTS 1422823  1/1976  United Kingdom .................... 426/614

*Primary Examiner*—Robert A. Yoncoskie
*Attorney, Agent, or Firm*—John P. Snyder

[57] ABSTRACT

An essentially cholesterol-free egg product which may be cooked to make scrambled eggs, omelets, egg patties, etc. contains egg white solids in amount greater than that contained in whole egg, plus non-fat milk solids and vegetable gum in the form of carboxymethyl cellulose to improve the eating quality of the product when cooked under a variety of conditions and, in addition to these conventional components, a minor amount of carrageenan sufficient to impart a still further improved cooking tolerance to the product. The product is also enhanced as to cooking tolerance by the addition thereto of up to 4% vegetable oil.

8 Claims, No Drawings

CHOLESTEROL-FREE EGG PRODUCT HAVING IMPROVED COOKING TOLERANCE

BACKGROUND OF THE INVENTION

This invention relates to an essentially cholesterol-free egg product and a process for making the same.

One of the major sources of food protein to man is derived from eggs. Over six billion pounds of eggs are consumed in the United States each year. Almost all eggs are consumed after cooking, primarily as fried eggs. Eggs may also be boiled, poached, baked or used as an ingredient in cakes, pies, sauces and other dishes. The unique functional properties of eggs, especially egg protein, gives cooked egg an eating quality unique among food proteins.

The liquid protein of shell eggs consists of two portions, the yolk and the liquid egg white. The yolk makes up 39 percent of the freshly cracked egg and contains about 45 percent solids, 14 percent protein, 30 percent fat and 1.5 percent cholesterol. When the term egg yolk is used, this is the product meant. The liquid egg white makes up about 61 percent of the whole egg and contains about 12 percent solids, 10 percent protein, only a trace of fat and no cholesterol. Liquid whole eggs containing the natural amounts of liquid yolk and liquid egg whites contain 25 percent solids, 75 percent water, 12 percent protein, 11 percent fat and about 0.6 percent cholesterol. The liquid whole eggs, liquid egg yolks and liquid egg whites can be dried to produce egg products containing less than 10 percent water. These dried egg products are known as whole egg solids, yolk solids and egg white solids, respectively. These dried egg products have approximately the same composition as the liquid products except for a lesser amount of water.

In recent years there has been shown that the consumption of cholesterol may be related to atherosclerosis. Although there is conflicting evidence on this relationship, the medical profession has advised patients with a tendency to have a high blood cholesterol or any symptoms of atherosclerosis to limit their consumption of cholesterol. Many nutritionists advise older people to lower their intake of dietary cholesterol.

Whole eggs are one of man's richest sources of high quality protein. However, whole eggs are also a rich source of dietary cholesterol containing approximately 550 mg. of cholesterol per 100 grams which is the approximated weight of the edible portion of two large whole eggs. Liquid egg whites contain no cholesterol. Liquid egg whites can be separated from liquid yolks and contains approximately 10 percent protein. The protein quality of liquid egg whites is almost equal to liquid whole eggs.

The unique cooked eating quality of eggs can be attributed primarily to the egg protein. However, the yolk also contains fats and natural emulsifiers like lecithin. The eating quality of liquid yolk and whites are different when the yolk and whites are cooked separately. This difference is observed when a freshly cracked egg is carefully placed in a frying pan without breaking the yolk. As the heat is applied under the frying pan the liquid white becomes firm and if heated too long will become very firm and have a rubbery texture. The yolk in the frying pan under the same heating conditions will firm more slowly and not develop the rubbery texture of egg whites. This difference in eating quality can be attributed to the different types of proteins in the two egg fractions and the pressure of oil and emulsifiers in the egg yolk. Blending the yolk and white in preparing cooked scrambled eggs minimizes the development of the rubbery texture of overcooked egg whites.

The most important characteristic of a cooked egg product is the proper texture. When cooked egg product is referred to herein, scrambled eggs is meant. The texture of scrambled eggs from a whole egg is generally considered to be firm, scrambling up to form large curds when a minimal of stirring is used. The whole scrambled egg has a firm-like mouthfeel without being mushy or mealy.

It has been found that there are tremendous variations in cooking operations in the cooking of liquid egg compositions. Some people cook the liquid composition in a skillet with high heat. Under such conditions, some cholesterol-free egg compositions will form fairly firm curds and have a firm mouthfeel. On the other hand, these same products when cooked in a double boiler will product a cooked egg product having a gelatinous mouthfeel. Clearly, such products can be expected to be unacceptable to many people and experience has shown this to be so.

It is important in a cholesterol-free egg product to have a composition which will cook to a texture and appearance of scrambled whole egg whether cooked quickly under fry pan heating conditions above 212° F. or cooked slowly in a double boiler at temperatures under 212° F. The better the cooked egg texture and appearance of cholesterol-free egg products prepared between these two extremes, the better the cooking tolerance. By cooking tolerance of a cholesterol-free egg product is meant the ability of the formulation to cook to a satisfactory texture and appearance whether cooked at temperatures either under 212° F. (double boiler) or over 212° F. (skillet).

In the Seeley et al U.S. Pat. No. 3,987,212, this improved cooking tolerance is obtained by making a product based upon liquid egg whites but containing an additional amount of egg white solids sufficient to provide about 12.5 to about 16% egg white solids in the liquid product and non-egg ingredients comprising non-fat milk solids (about 1 to about 3.5%) and vegetable gum (about 0.25 to about 1.3%) in the form of carboxymethyl cellulose, the product containing about 80 to about 85% water. The additional amount of egg white solids (greater than that contained in liquid egg whites) and the non-egg ingredients are responsible for a substantially improved cooking tolerance of the product, especially when cooked in a double boiler at temperature less than 212° F. This prior art product may also contain small amounts of an anti-foam agent in the form of mono and diglycerides of fat-forming fatty acids as well as small amount of flavor enhancer preferably in the form of a yeast extract.

BRIEF SUMMARY OF THE INVENTION

The present invention relates to the discovery that the above described prior art egg product may be materially and still further improved in regard to its cooking tolerance by the addition of a minor amount of carrageenan. Both iota and kappa carrageenans, or a mixture thereof, may be used although calcium carrageenan (an iota carrageenan) is preferred. The formulations, particularly when a cooked, frozen product is produced therefrom, may also include one or more of other ingredients such as adipic or citric acids, potassium citrate, locust been gum and/or calcium sulfate which are known to increase the gel strength, upon cooling, of carrageenen-containing formulations.

Carrageenan is a refined water-soluble gum extracted from certain marine plants (red algae) and is a hydrocolloid which forms gels upon heating and subsequent cooling. Its use in the formulations of this invention increases curd formation as the product is cooked, even at low temperatures below 212° F. The mechanism by which carrageenan improves and increases the curd formation as the product is cooked is not understood, inasmuch as the gel-forming characteristics of carrageenan occur on cooling, not heating. The carrageenan probably combines with the egg white protein, but it is unexpected that carrageenan in small amounts (not more than about 0.5% by weight of the liquid product) should improve curd formation. Based upon the liquid product, the carrageenan is present in amount of about 0.15% to about 0.50% by weight.

Additionally, the cooking tolerance of the composition may be still further improved by the addition of up to 4% by weight of vegetable oil, substituted for a corresponding amount of liquid egg whites. This addition also avoids sticking to the utensil when the product is cooked.

DETAILED DESCRIPTION OF THE INVENTION

Whereas it is difficult to measure cooking tolerance by cooking the egg product in a skillet, it can be measured by cooking in a double boiler.

The improved cooking tolerance of the cholesterol-free egg product described in this invention has been determined by observing the curd formation during a double boiler cook. The procedure is described below:

Double Boiler Cook

1. A measured amount of cholesterol-free egg product (500 gms. or 1000 gms.) is placed in the inner section of a two quart aluminum double boiler with the water in the outer vessel actively boiling.

2. The egg mix was stirred gently with a wooden spoon in a circulatory motion and the temperature of the mix measured continuously.

3. The stirring is continued without scraping the sides until the temperature of the mix essentially plateaus.

4. At the occurrence of the first temperature plateau, the insulating layer of coagulated egg product is rapidly scraped from the sides of the double boiler and the heating continued until the temperature again plateaus and the scraping is repeated, heating is continued and scraping is repeated at each subsequent temperature plateau.

5. The cooking is terminated when the liquid egg is essentially all coagulated as in a soft scrambled egg.

6. The cooked produce is immediately removed from the double boiler.

7. The temperature of the first and subsequent scrapes and the type of curd formed are recorded.

The lower the temperature of the first scrape and the thicker the curd on the walls of the double boiler demonstrate that the coagulation temperature of the mixture of egg white proteins and the added ingredients is lower. A lower temperature of the first scrape is a measure of an improved cooking tolerance.

In Table I are the compositions of three commercial cholesterol-free egg substitutes. In Table II are the results of the double-boiler cooks of these three products. In each case the temperature of the first scrape was above 124° F. and the curds were thin.

TABLE I

Composition of Three Commercial Egg Substitutes

Product A

| | |
|---|---|
| Liquid Egg Whites | 88.5% |
| Egg White Solids | 3.0% |
| Water | 5.3% |
| Non-Fat Dry Milk | 2.0% |
| Cellulose Gums | 1.0% |
| Mono & Diglycerides | 0.1% |
| Flavor Enhancers, Color Solution, Vitamins | .1% |

Product B

| | |
|---|---|
| Egg Whites | 82.0% |
| Corn Oil | 10.0% |
| Non-Fat Dry Milk | 7.0% |
| Lecithin, Mono-Diglycerides Propylene Monosterate, Cellulose and Xanthan Gums | |
| Vitamins and Minerals | Less than 1.0% |

Product C

| | |
|---|---|
| Liquid Egg Whites | 84.0% |
| Water | 7.0% |
| Soybean Oil | 3.0% |
| Isolated Soy Protein | 2.5% |
| Egg White Solids | 1.8% |
| Cellulose Gums, Sodium Stearyl-2-Lactylate Xanthan Gum, Minerals and Vitamins | Less than 2.0% |

TABLE II

| | Temperature of First Scrape | Type of Curds |
|---|---|---|
| Product A | 128° | Thin Curd |
| Product B | 130° | Thin Curd |
| Product C | 124° | Thin Curd |

Product A is the preferred composition of the cholesterol-free egg substitute described in the aforementioned U.S. Pat. No. 3,987,212. Although increased levels of egg white solids improved the cooking tolerance in a double boiler cook of this formulation, the higher levels of egg white solids significantly increase costs of the liquid cholesterol-free egg product. Moreover, skillet cooked scrambled eggs from a cholesterol-free egg product containing 85% or more liquid egg whites and more than 3% egg white solids are firmer and rubbery compared to skillet cooked whole eggs.

To illustrate the improved according to this invention, reference is had to Table III.

TABLE III

| | Formula #1 % | Formula #1 + Calcium Carrageenan Gum System (MC-20) % |
|---|---|---|
| Liquid Egg Whites | 88.515 | 87.885 |
| Dried Egg Whites | 3.000 | 3.000 |
| Water | 5.300 | 5.300 |
| Non-Fat Milk Solids | 2.000 | 2.000 |
| CMC 7LF | 0.750 | 0.750 |
| CMC 7H3SXF | 0.250 | 0.250 |
| Adipic Acid | | .100 |
| Calcium Carrageenan | | .320 |
| Potassium Citrate | | .110 |
| Locust Bean Gum | | .070 |
| Calcium Sulfate | | .030 |
| Atmos 300 | 0.100 | 0.100 |
| Flavor Enhancer | 0.050 | 0.050 |

TABLE III-continued

|  | Formula #1 % | Formula #1 + Calcium Carrageenan Gum System (MC-20) % |
|---|---|---|
| Color Solution | 0.035 | 0.035 |
| Double Boiler Cook |  |  |
| Temp. 1st Scrape | 135° F. | 110° F. |
| Type of Curds | Thin curds | Large, firm curds |
| Skillet-Cooked Texture | good | superior to Formula #1 |
|  | Wet look | Dry look |

Formula # is product A in TABLE I and has been reformulated as MC-20 according to this invention by substituting calcium carrageenan in amount of 0.320% by weight in addition to small amounts of adipic acid, potassium citrate, locust bean gum and calcium sulfate as gel-strengthening ingredients, for some of the liquid egg whites.

The inclusion of calcium carrageenan resulted in improved cooking tolerance in the double boiler cook as evidenced by the lowered temperatures of the first scrape. The temperature of the first scrape of the formula containing calcium carrageenan (MC-20) was 110° F. vs. 135° F. for the formula without carrageenan. The carrageenan formula had large firm curds demonstrating that in the slow double-boiler cooking process the egg proteins and other ingredients were coagulating more easily and in a more definite denatured protein complex. The greater cooking tolerance of the formula MC-20 was also demonstrated when this formula was skilled cooked.

The improved cooking tolerance of the cholesterol-free egg formulation MC-20 results from the addition of calcium carrageenan to the formula. In Table IV the double-boiler cooks of fomulae based on MC-20 are compared. Formula MC-22 containing no added potassium citrate, locust bean gum or calcium sulfate had essentially the same cooking tolerance as formula MC-20. However, the addition of these gel-strengthening agents employed in MC-20 is preferred when a cooked, frozen product is to be made, as will appear hereinafter. The level of calcium carrageenan to obtain the improved cooking tolerance of this invention is between 0.15% to 0.5%. In formula MC-30, citric acid replaced adipic acid with similar results. The addition of an organic acid is not essential in these formulae, but the lower pH (about 7.4) attained by such addition does improve the texture of the cooked product to a small degree.

There are several types of carrageenans. The type of carrageenan depends on the species of seaweed, commonly known as "Irish Moss," from which the seaweed hydrocolloid is derived and by methods of isolation and fractionation. Three types of carrageenan are classified as Kappa, lambda and iota. The different types vary in properties. Kappa and iota carrageenans form gels, lambda carrageenan is non-jelling. The kappa and iota carrageenans form gels reversable with heat. In non-egg food systems the different types of carrageenans function differently. In the cholesterol-free formulations shown in Table V the cooking tolerance of the formulations made with either iota carrageenan or kappa carrageenan and combinations of iota and kappa were essentially the same.

TABLE V

Formula Variations of Basic Formula MC-20
Comparison of Iota and Kappa Carrageenans

|  | MC-26 % | MC-27 % | MC-28 % |
|---|---|---|---|
| Iota Carrageenan with Locust Bean Gum | 0.32 |  | 0.32 |
| Kappa Carrageenan with Locust Bean Gum | | 0.39 | 0.10 |
| Double Boiler Cook |  |  |  |
| Temp. of 1st Scrape | 110 | 110 | 110 |
| Temp. Additional Scrapes | 140,145,150 | 130,140,150 | 130,140,154 |
| Type of Curds | Thick | Thick | Thick |

The addition of small amounts of vegetable oil to a carrageenan-containing formula provides still further enhancement of cooking tolerance. This is demonstrated in Table VI. Up to about 4% vegetable oil can be included in the cholesterol-free formulations and when vegetable oil is added to the formula an equivalent amount of liquid egg whites is removed from the formula. Some improvement in cooking tolerance is obtained in MC-55 as evidenced by lowering of the temperature of the second scrape (120° F. as compared with 130° F. for MC-54). In MC-56, the temperatures of the first and second scrapes were lowered as compared with MC-54.

TABLE IV

Formula Variations of Basic Formula MC-20

|  | MC-20 % | MC-22 % | MC-24 % | MC-25 % | MC-30 % |
|---|---|---|---|---|---|
| Adipic Acid | 0.1 | 0.1 | 0.05 | 0.15 |  |
| Citric Acid |  |  |  |  | 0.1 |
| Calcium Carrageenan | .32 | 0.32 | 0.16 | 0.48 | 0.28 |
| Potassium Citrate | 0.11 |  | 0.055 | 0.165 | 0.10 |
| Locust Bean Gum | 0.07 |  | 0.0325 | 0.102 | 0.06 |
| Calcium Sulfate | 0.03 |  | 0.015 | 0.045 | 0.03 |
| Double Boiler Cook |  |  |  |  |  |
| Temp. 1st scrape | 110° | 110° | 110° | 110° | 114° |
| Temp. addition | 120, 130 | 120,130, | 132,140, | 130,140 | 130,140, |
| scrapes | 140 | 144 | 145 | 150,160 | 160 |
| Type Curds | Thick | Thick | Thinner | Thick firmer than MC20 | Very thick Softer than MC20 |

TABLE VI

Carrageenan Formula with Various Levels of Vegetable Oil

Basic Formula-
Liquid Egg Whites (88.3%), Dried Egg Whites (3.0%)
Water (5.0%), Non-Fat Dry Milk (2.0%), CMC 7LH(0.75%),
CMC 7H3SXF (0.25%), Citric Acid (0.1%), Calcium
Carrageenan-Locust Bean Gum (0.28%), Atmos 300 (0.3%)
Color Solution (0.035%)

|  | Basic Formula (MC-54) | Formula (MC-55) | Formula (MC-56) |
| --- | --- | --- | --- |
| % Vegetable Oil | 0 | 2 | 4 |
| Double Boiler Cook |  |  |  |
| Temp. 1st Scrape | 110° | 110° | 100° |
| Temp. Additional Scrapes | 130,140,154, 158 | 120,140,154, 158 | 120,130,140, 150,155,157 |
| Type of Curds | Thick | Thick | Thick |

The preferred formula of this invention is shown in Table VII. The superior cooking tolerance of egg substitute formulations containing carrageenan are demonstrated with or without added vegetable oil up to about 4 percent. The carboxymethyl celluloses (CMC) used in this formula are two types, a high viscosity CMC #7H3SXF and a low viscosity CMC #7LF. Various combinations of different types of CMC's can be used but this is the preferred formula.

Atmos 300 is the trade name for a mixture of mono and diglycerides. The amount in the formula can be varied but levels of from 0.1% to about 0.5% are the range with 0.3% being preferred.

The addition of minoramounts of vitamins, minerals, flavoring agents and artificial and natural colors to the formula are considered to be within the scope of this invention.

TABLE VII

Formula #69

| Liquid Egg Whites | 86.2 |
| --- | --- |
| Dried Egg Whites | 3.0 |
| Water | 5.0 |
| Non-Fat Dry Milk | 2.0 |
| CMC 7LF | 0.75 |
| CMC 7H3SXF | 0.25 |
| Citric Acid | 0.1 |
| Calcium Carrageenan (Iota) | 0.28 |
| Vegetable Oil | 2.0 |
| Atmos 300 | 0.3 |
| Color Solution (Yellow #6 & #5) | 0.035 |
| Monosodium Glutamate | 0.05 |
| Sodium Inosinate- Sodium Guanylate | 0.035 |
| Double Boiler Cook |  |
| Temp. 1st Scrape | 110° |
| Temp. Additional Scrapes | 120, 130, 140, 150, 150° |
| Skillet Fry Quality - | Firm, not mushy or mealy, dry look, no syneresis. Egg mix sets up quickly and can be folded as with whole eggs. |

A convenient method of manufacturing the preferred product of this invention is to blend the dry ingredients of the composition shown in Table VIII, add approximately 64 pounds of this dry blend to approximately 862 pounds of liquid egg whites, 50 pounds of water, 20 pounds of vegetable oil and 3 pounds of mono and diglycerides (Atmos 300). The liquid mix is pasteurized, cooled, packed and frozen.

TABLE VIII

Blend of Dry Ingredients for
Cholesterol-Free Egg Substitute

| | % |
| --- | --- |
| Dried Egg Whites | 47 |

TABLE VIII-continued

Blend of Dry Ingredients for
Cholesterol-Free Egg Substitute

| | % |
| --- | --- |
| Non-Fat Dry Milk | 31.5 |
| CMC | 14.6 |
| Citric Acid | 1.5 |
| Calcium Carrageenan | 4.4 |
| Flavor Enhancers, Vitamins, Minerals and Yellow Colorings | 1.0 |
| | 100.0 |

The level of carrageenan in this formula can be from 2.5% to 7.5% with a corresponding increase or decrease in the percent of non-fat dry milk solids from 28.1% to 33.5%. The range of carrageenan in the final cholesterol-free egg product would be from 0.15% to 0.48%.

The invention disclosed herein is also useful in preparing a frozen, pre-cooked egg product.

One method of manufacturing frozen pre-cooked whole egg patties is to add to the egg mixture an ingredient which will give gel strength to a cooked mass of scrambled eggs on cooling. The gelled mass of scrambled eggs will have sufficient cohesion to be formed into egg patties by passing through a hamburger forming machine such as a Hollymatic 400. In this process a gelling-type food ingredient, for example 1% gelatin, is added to whole eggs, cooked in a steam-jacketed kettle (Groen) with intermittent scraping of the curds from the sides of the steam-jacketed kettle until the whole mass of eggs has the cooked consistency of soft scrambled eggs.

The cooked eggs are dumped into trays, cooled in a refrigerator to 34–40° F., passed through a hamburger-forming machine (Hollymatic), and the 3–3 ½ inch diameter egg patties are frozen and packed in poly-ethylene bags. The frozen egg patties can be reheated in a fry pan, oven, micro-wave oven, convection or infra-red oven and served as an "egg-burger".

Frozen pre-cooked cholesterol-free egg patties can also be produced by the above process described for whole eggs, but cholesterol-free egg product formulations are more difficult to cook because the formulations have a lower cooking tolerance than whole eggs. It is necessary to have good curd formulation on the inner sides of the steam-heated jacket of the cooking kettle.

The addition of about 1% gelatin to a cholesterol-free egg mixture of Table I produces good curd formation in the steam-jacketed cook, but the frozen pre-cooked cholesterol-free patties on reheating had gelatinous mouth-feel (Table IX). The temperatures of the first scrape were from 120° F. to 140° F.

TABLE IX

Curd Formation of Three Commercial Egg Substitutes
Containing 1.2% Added Gelatin
Double Boiler and Skillet Cooks

| | Product A | Product B | Product C |
| --- | --- | --- | --- |
| Double Boiler Cook- 1st Scrape | 120° F. | 130° F. | 140° F. |
| Skillet Cooked Texture of Liquid Formulation | soft-gelatinous | firm, gelatinous | firm, gelatinous |

It was discovered that carrageenan, when added to cholesterol-free egg formulations will not only improve the curd formation in a steam-jacketed cook as noted above but will also improve the texture of a reheated frozen pre-cooked cholesterol-free egg patties. The texture of the pre-cooked, frozen and reheated product is still further improved by the addition of the gel-strengthening agents noted above which are known to increase the gel strength of carrageenan-containing formulations upon cooling.

The following examples illustrate a preferred embodiment of the invention.

EXAMPLE I

Special dry Blend #69

A premix of 1,110 grams of a mixture of disodium inosinate and disodium guanylate, 1,815 grams of ferric orthophosphate, 889 grams of a mixture of artificial colors, 27 grams of thiamine hydrochloride were blended with 1,500 pounds of dried egg whites, 1,004 pounds of non-fat dry milk, 139 pounds of Calcium Carrageenan, 371 pounds of CMC 7LF, 94 pounds of CMC 7H3SXF, 49 pounds of citric acid and 23 pounds of monosodium glutamate in a ribbon blender. The mix was blended for 20 minutes. The mix was packed in poly-lined fiber drums in 64 pound lots. Each drum contained the dry ingredients for a 1,000 pound batch of cholesterol-free egg substitute.

EXAMPLE II

To 2,586 pounds of liquid egg whites in a refrigerated tank were added 150 pounds of water, 60 pounds of vegetable oil and 9 pounds Atmos 300 (mono and diglycerides). The liquid mix was agitated for 5 minutes. Three drums of 64 pounds each of Blend #69 (total 192 pounds) were added through a tri-blender and recirculated through the tri-blender and the tank for 4 hours. The mix was then pasteurized using hydrogen peroxide and a pasteurization temperature of 126° for 6minutes. The pasteurized product was cooled through a plate cooler and pumped into a hold tank. The product was then packed in ½ pint cartons and frozen.

EXAMPLE III

To 862 grams of liquid egg whites where added 20 grams of vegetable oil, 50 grams of water and 3 grams of mono and diglycerides (Atmos 300) in a blender. Under slow agitation 64 grams of the dry blend #69 of the composition in Example I was added to the mix. After blending for 1 hour or until a stable suspension was formed the 1,000 grams of egg substitute was cooled.

1,000 Grams of this egg substitute were added to a 2 quart aluminum double boiler with the water in the outer vessel actively boiling. The mix was agitated with intermittent scraping of the cooked egg from the sides of the double boiler. The sides and bottom were scraped when the thickness of the coagulated egg became sufficiently thick to form a curd. The cooking and intermittent scraping were continued until the whole egg mix was coagulated to the consistency of solft scrambled eggs. The initial scrape was at about 110° F. and the final scrape at about 150° F.

The cooked cholesterol-free egg substitute was transferred to aluminum foil, wrapped and cooled to 32–36° F. The cooled product was formed into 3 3½ inch diameter patties in a hamburger former. The patties were frozen to make a pre-cooked frozen egg pattie.

What is claimed is:

1. An essentially cholesterol-free egg product consisting essentially of, by weight, 84–88% liquid egg whites, about 3% egg white solids, about 2% non-fat dry milk, about 1% carboxymethyl cellulose, about 0.1–0.3% mono- and diglycerides, about 5% water, from 0–4% vegetable oil, about 0.05% to 0.15% of an organic acid selected from the group consisting of citric and adipic acids, and about 0.15–0.50% carrageenan, said product being capable of being cooked in a steam-jacketed vessel into scrambled egg form closely resembling scrambled eggs cooked from whole egg.

2. The product of claim 1 including 0.05% of flavor enhancer selected from the group consisting of monosodium glutamate, sodium isosinate, sodium guanylate and mixtures thereof.

3. The product of claim 1 including artificial coloring substance.

4. The product of claim 1 which is cooked and frozen.

5. The method of making an essentially cholesterol-free egg product, which comprises the steps of:
   (a) providing a dry blend consisting essentially by weight of about 47% dried egg whites, about 28.1% to about 33.5% non-fat dry milk, about 14.6% carboxymethyl cellulose, about 1.5% citric acid, and about 2.5% to about 7.5% carrageenan; and
   (b) blending the dry blend of step (a) with sufficient liquid egg whites and water to yield a liquid product containing an equivalent of about 84–88% liquid egg whites with about 5% water, about 1% carboxymethyl cellulose, about 2% non-fat dry milk, about 0.1% citric acid and from about 0.15% to about 0.50% carrageenan.

6. The method according to claim 5 wherein step (b) includes the substitution of vegetable oil for an equivalent amount of the liquid egg whites to provide not more than 4% vegetable oil in the liquid product.

7. A liquid egg product essentially free of cholesterol and capable of forming initial curds, when cooked in a steam-jacketed vessel, at temperature not greater than about 120° F. which comprises by weight, 84–88% liquid egg whites, about 3% egg white solids, about 2% non-fat dry milk, about 1% carboxymethyl cellulose, about 5% water, about 0.1% to about 0.3% mono- and diglycerides, up to 4% vegetable oil, about 0.05% to 0.15% of an organic acid selected from the group consisting of citric an adipic acids, and about 0.15% to about 0.50% carrageenan.

8. The product of claim 7 comprising 86.1–86.4% liquid egg whites, 3% dried egg white solids, 5% water, 2% non-fat dry milk, 0.75% carboxymethyl cellulose of low viscosity, 0.25% carboxymethyl cellulose of high viscosity, 0.1% citric acid, 0.15–0.50% calcium carrageenan, 2% vegetable oil, 0.3% mono- and diglycerides, and 0.05% flavor enhancers.

* * * * *